United States Patent [19]

Fukazawa et al.

[11] Patent Number: 5,006,568

[45] Date of Patent: Apr. 9, 1991

[54] VOLATILE FOAMING AGENT COMPOSITION

[75] Inventors: Hiromitsu Fukazawa; Motosuke Ogawa, both of Shimizu, Japan

[73] Assignee: Dupont-Mitsui Fuluorochemicals Co., Ltd.

[21] Appl. No.: 562,410

[22] Filed: Aug. 2, 1990

Related U.S. Application Data

[63] Continuation of Ser. No. 291,584, Dec. 29, 1988, abandoned.

[51] Int. Cl.$^5$ ................................................ C08J 9/14
[52] U.S. Cl. .............................. 521/98; 264/DIG. 5; 521/98; 521/142; 521/143; 521/146; 521/910; 521/150
[58] Field of Search ................ 521/98, 142, 143, 146, 521/150, 910; 264/DIG. 5

[56] References Cited

U.S. PATENT DOCUMENTS 4,771,080  9/1988  Ibuki et al. ........................ 521/145

*Primary Examiner*—Morton Foelak
*Attorney, Agent, or Firm*—Cushman, Darby & Cushman

[57] ABSTRACT

It is an object of the present invention to provide a volatile foaming agent composition for thermoplastic resins capable of producing a thermoplastic resin foam without any shinkage or expansion after foaming.

A volatile foaming agent composition for thermoplastic resins according to the present invention comprises 1,1,1,2-tetrafluoro-ethane.

As the permeability of 1,1,1,2-tetrafluoro-ethane in thermoplastic resins is smaller than that of the air, volatile foaming agent composition containing 1,1,1,2-tetrafluoro-ethane and other kind of volatile foaming agent having permeability higher than that of the air can be regulated to have the permeability similar to that of the air.

Accordingly, the permeating speed of volatile foaming agent from the inside of foam cells to the outside and the permeating speed of substituting air into the foam cells from outside can be balanced and any shrinkage or expansion after foaming can be avoided.

4 Claims, No Drawings

VOLATILE FOAMING AGENT COMPOSITION

This is a continuation of application Ser. No. 291,584, filed on Dec. 29, 1988 which was abandoned upon the filing hereof.

FIELD OF THE INVENTION

The present invention relates to a volatile foaming agent composition for thermoplastic resins such as polyethylene, polypropylene, polybutylene and so on.

DESCRIPTION OF THE PRIOR ART

Heretofore, in a foaming process of thermoplastic resins, especially polyolefin such as polyethylene, using a volatile foaming agent, there has been a problem of foam cell shrinkage immediately after extrusion foaming of a molten resin.

It is attributed to the difference between the permeability of the air and that of the volatile foaming agent in the resin used. Namely, though the conventional volatile foaming agent quickly permeates from the inside of foam cells to the outside, but substituting air permeates slowly into the foam cells from outside.

The unbalance of the permeating speed of the volatile foaming agent from the inside of the foam cells to the outside and the permeating speed of substituting air into the foam cells from the outside causes the shrinkage of the resin foam after foaming.

Accordingly, to get dimensional stability of the resin foam, it is required to subject the resin foam to a long term aging treatment after extrusion foaming.

In a case of a resin foam product in a shape of a sheet, for example, it is necessary to wind it in a shape of a roll for a long term storage, then to rewind the roll at use.

As the permeability of 1,2-dichloro-tetrafluoro-ethane (CFC-114) [CFC: Chloro-Fluoro-Carbon] in thermoplastic resins is comparatively similar to that of the air, it has been used widely as a volatile foaming agent for thermoplastic resins, but it cannot solved out the shrinking problem completely.

On the other hand, materials called as anti-shrinking agent have been proposed, but their effects have not been confirmed yet.

SUMMARY OF THE INVENTION

It is an object of the present invention to provide a volatile foaming agent composition capable of producing thermoplastic resin foam without any shrinkage or expansion after foaming.

DETAILED DESCRIPTION OF THE PREFERRED EMBODIMENTS

Volatile foaming agent composition for thermoplastic resins according to the present invention comprises 1,1,1,2-tetrafluoro-ethane (CFC-134a) as a component of the composition.

It has been discovered that the permeability of 1,1,1,2-tetrafluoro-ethane (CFC-134a) in thermoplastic resins is enough lower than those of conventional volatile foaming agents, which has been used for the foaming of thermoplastic resins, such as propane, butane, pentane, trichloro-monofluoro-methane (CFC-11), dichloro-difluoro-methane (CFC-12), 1,2-dichloro-tetrafluoro-ethane (CFC-114), and even lower than that of the air.

As the permeability of 1,1,1,2-tetrafluoro-ethane (CFC-134a) is lower than that of the air, it is not preferable to use it alone due to the expansion of the resin foam on standing after foaming.

It is recommended to use 1,1,1,2-tetrafluoro-ethane (CFC-134a) as a mixture with conventional volatile foaming agent having permeability higher than that of the air in thermoplastic resins.

By selecting an appropriate mixing ratio of 1,1,1,2-tetrafluoro-ethane (CFC-134a) and conventional volatile foaming agent having permeability higher than that of the air, a foaming agent composition having permeability practically equal to that of the air can be obtained.

Volatile foaming agents to be mixed with 1,1,1,2-tetrafluoro-ethane (CFC-134a) in the present invention may be any of the conventional volatile foaming agents such as propane, butane, pentane, trichloro-monofluoro-methane (CFC-11), dichloro-difluoro-methane (CFC-12), tetrafluoro-methane (CFC-14), monochloro-difluoro-methane (CFC-22), dichloro-trifluoro-ethane (CFC-123), and so on, and one kind or plural kinds of these conventional volatile foaming agents can be mixed with 1,1,1,2-tetrafluoroethane (CFC-134a).

As the permeability of these volatile foaming agent differs by the kind of the foaming agent (refer to Table 1) and by the kind of thermoplastic resin to be applied, the mixing ratio of 1,1,1,2-tetrafluoro-ethane (CFC-134a) and the other volatile foaming agent should be decided by the measurement of permeability of each volatile foaming agent in the thermoplastic resin to be applied and by experimental operation.

Thermoplastic resins applicable the volatile foaming agent composition of the present invention are polyolefins such as homopolymers of ethylene, propylene, butylene etc., copolymers of these olefins, copolymers of any of these olefins with other vinyl monomer(s), or a blend of those polymers. For example, high density polyethylene, polypropylene, polystyrene or polymer blends of polystyrene etc. can be employed.

It is unnecessary to change the conventional foaming process of thermoplastic resins. For example, polyolefin foam can be produced by blending polyolefin resin well with a core-forming agent, feeding it into a heated extruder through a hopper, supplying a volatile foaming agent in it under pressure, and extruding it through a temperature-controlled nozzle to the outside atmosphere.

The shape of extruded foam can be a sheet, a bar or any desired form and the core-forming agent applicable to the case may be any powders or so-called decomposition type ones.

A foam product obtained according to the present invention does not shrink or expand after extrusion.

Therefore, it is unnecessary to subject the foam product to a long term aging treatment, and troublesome procedure and time of winding, storage and rewinding of the foam can be saved.

PERMEABILITY TEST

Gas permeability values of low density polyethylene film without crosslinking (thickness: 50 microns) were measured by using a Dr. Lyssy type gas and moisture permeation-measuring apparatus.

Mean values of data obtained by two times measuring of permeability of each gas and their ratio to the air are shown in Table 1, as the permeability of air 1.0.

As shown in Table 1, the permeability of a volatile foaming agent composition containing 1,1,1,2-tetrafluoro-ethane (CFC-134a) as a component in a appropriate ratio is almost equal to that of the air.

TABLE 1

| Gas | mixing ratio | Permeability liter/ m²·day·atm at STP *1 | Ratio to the air |
|---|---|---|---|
| the Air | | 1.38 | 1.0 |
| CFC-11 | | 19.5 | 14.1 |
| CFC-12 | | 4.07 | 2.9 |
| CFC-114 | | 2.05 | 1.5 |
| CFC-134a | | 0.60 | 0.4 |
| CFC-11/CFC-134a | (5.5/94.5) | 1.37 | 1.0 |
| CFC-12/CFC-134a | (25/75) | 1.40 | 1.0 |
| CFC-114/CFC-134a | (70/30) | 1.46 | 1.1 |

*STP: the Standard Temperature and Pressure

EXAMPLE 1

To 10 weight parts pellets of low density polyethylene without crosslinking (HI: 7.2, Density: 0.917 g/cm², Melting point: 106° C.), 0.3 weight part of the talc was added as a core-forming agent and blended well in a blender and they were fed to an extruder, where they were heated and melted, moved forward inside the extruder by a screw, and a volatile foaming agent composition composed of a mixture of dichloro-difluoro-methane (CFC-12) with 1,1,1,2-tetrafluoro-ethane (CFC-134a) by the weight ratio of 25:75 was introduced into the extruder under pressure given by a pump, and mixed well with the molten resin.

The molten resin mixed with the volatile foaming agent was pushed out through a nozzle kept at a temperature of 110° C., from the outlet of the extruder to the outside and a bar-like foam product with a diameter of 13 millimeters was obtained.

The foam product had about 30 times foaming rate with fine homogeneous foam and did not show any shrinkage or expansion from the dimension obtained immediately after the foaming.

In this manner, by using the volatile foaming agent composition according to the present invention, a thermoplastic resin foam product without any shrinkage or expansion after foaming can be prepared.

What is claimed is:

1. A method of blowing a thermoplastic polymer comprising mixing a volatile blowing agent into the molten polymer and blowing the polymer; wherein said blowing agent comprises a mixture of 1,1,1,2 tetrafluoroethane with other volatile blowing agents having a permeability higher than air in the thermoplastic polymer and where the ratio of the 1,1,1,2 tetrafluoroethane to the other volatile blowing agents is regulated so that the overall gas permeability of the volatile mixture in the thermoplastic polymer is comparable to that of air; and wherein the thermoplastic polymer is selected from polyethylene, polypropylene, polybutadiene, or polystyrene.

2. A method of blowing a thermoplastic polymer according to claim 1, wherein the other volatile blowing agent is trichloro-monofluoro-methane.

3. A method of blowing a thermoplastic polymer according to claim 1, wherein the other volatile foaming agent is dichloro-difluoro-methane.

4. A method of blowing a thermoplastic polymer according to claim 1, wherein the other volatile foaming agent is 1,2-dichlorotetrafluoro-ethane.

* * * * *